United States Patent [19]

Vatt

[11] Patent Number: 5,641,134
[45] Date of Patent: Jun. 24, 1997

[54] SATELLITE CELLULAR TELEPHONE AND DATA COMMUNICATION SYSTEM AT AN INCLINED ORBIT

[75] Inventor: Gregory Barton Vatt, Mesa, Ariz.

[73] Assignee: Motorola, Inc., Schaumburg, Ill.

[21] Appl. No.: 363,797

[22] Filed: Dec. 27, 1994

[51] Int. Cl.⁶ .............. B64G 1/24; H04B 7/185; H04B 7/204

[52] U.S. Cl. .............. 244/158 R; 379/60; 455/12.1; 455/13.2; 342/352

[58] Field of Search .............. 244/158 K; 379/59, 379/60; 455/12.1, 13.1, 13.2, 13.3; 342/352, 354, 355, 356, 357

[56] References Cited

U.S. PATENT DOCUMENTS

| | | | |
|---|---|---|---|
| 3,340,531 | 9/1967 | Kefalas et al. | 455/13.1 |
| 3,497,807 | 2/1970 | Newton | 325/4 |
| 4,502,051 | 2/1985 | Dondl | 455/12.1 |
| 4,809,935 | 3/1989 | Draim | 244/158 R |
| 4,854,527 | 8/1989 | Draim | 244/158 R |
| 4,943,808 | 7/1990 | Dulck et al. | 342/356 |
| 5,343,512 | 8/1994 | Wang et al. | 455/12.1 |
| 5,415,368 | 5/1995 | Horstein | 455/12.1 |
| 5,471,641 | 11/1995 | Dosiere et al. | 455/13.1 |

FOREIGN PATENT DOCUMENTS 365885   2/1990   European Pat. Off. .

OTHER PUBLICATIONS

Rastrilla, "MaGSS-14: a Medium-Altitude Global Mobile Satellite System for Personal Communications CL-BAND (ESTEC)" Jun. 1992.

Elliosat Corporation, Application Before the FCC, pp. 1-42 Apr. 11, 1991.

Royal Aircraft Establishment. Technical Report 77044 "Continuous Whole-Earth Coverge by Circular-Orbit Sat. Patterns", Walker Sep. 1977.

Draim, "Satellite Constellations for Optimal Northern Hemisphere Coverage" Oct. 4-7, 1983.

Royal Aircraft Establishment, Technical Report 82116 "Coverage Predictions and Selection Criteria for Satellite Constellations," Walker,Dec. 1982.

"Continuous Whole-Earth Coverage by Circular-Orbit Satellite Patterns", Technical Report 77044, 24 Mar. 1977, J. G. Walker, Procurement Executive, Ministry of Defence, Farnborough, Hants.

*Primary Examiner*—Andres Kashnikow
*Assistant Examiner*—Virna Lissi Mojica
*Attorney, Agent, or Firm*—Harold C. McGurk, IV

[57] ABSTRACT

An improved satellite cellular telephone and data communication system facilitates dual satellite coverage over at least eighty-five percent of the earth. This improved system permits communication with hand held and mobile mounted cellular telephones (120). The system permits two-way communications anywhere on or above the earth up to a particular height above the earth of several hundred nautical miles. The system employs a number of low-earth orbiting satellites (12) moving about the earth in orbit. The satellites (12) are inclined at an angle between 30 and 90 degrees. Links (102) are provided from the satellites directly to the users (120) and via the public switched telephone network (20) to other users. The satellites (12) are interconnected via links in a ring structure surrounding the earth. Switching is performed by each of the satellites (12).

18 Claims, 5 Drawing Sheets

SATELLITE CELLULAR TELEPHONE AND DATA COMMUNICATION SYSTEM AT AN INCLINED ORBIT

RELATED INVENTIONS

The present invention is related to Satellite Cellular Telephone and Data Communication System, filed on Sep. 3, 1991 and having U.S. Ser. No. 752,983. The patent application is assigned to the assignee of the present invention.

FIELD OF THE INVENTION

The present invention pertains to mobile communications and, more particularly, to an improved satellite cellular telephone and data communication system.

BACKGROUND OF THE INVENTION

In some conventional satellite communication systems, satellites or nodes orbit earth in a polar orbit. That is, the satellites orbit around earth in an orbit that crosses over the north and south poles. Although satellites in a polar orbit provide coverage over the entire earth, two problems exist.

First, polar-orbiting satellites create a counter-rotating seam. A counter-rotating seam is created by satellites travelling in opposite directions. For example, suppose satellites orbit from the south pole to the north pole. Once they pass the north pole, the satellites begin travelling in the opposite direction. Namely, the satellites then travel from the north pole to the south pole (i.e., the other half of the orbit). After passing the south pole, the satellites travel again in an upward direction toward the north pole. Thus, the counter-rotating seam is created by some satellites which are travelling on one-half of the orbit passing other satellites which are travelling on the other half of the orbit. The counter-rotating seam creates a problem of how to establish and maintain communication between satellites travelling in opposite directions.

Second, although polar-orbiting satellites optimize coverage for single satellite coverage for the entire earth, dual beam coverage may require doubling the number of satellites or adding more capability to the satellites themselves. However, doubling the number of satellites and adding more capability to a satellite significantly increases the cost of the system. Also, more weight is usually added to a satellite whenever the capability is increased.

Accordingly, it is an object of the present invention to provide a low-earth orbiting multiple satellite cellular communication system which eliminates a counter-rotating seam and provides continuous dual communication coverage over most of the earth.

DESCRIPTION OF THE PREFERRED EMBODIMENTS

Figure 1:
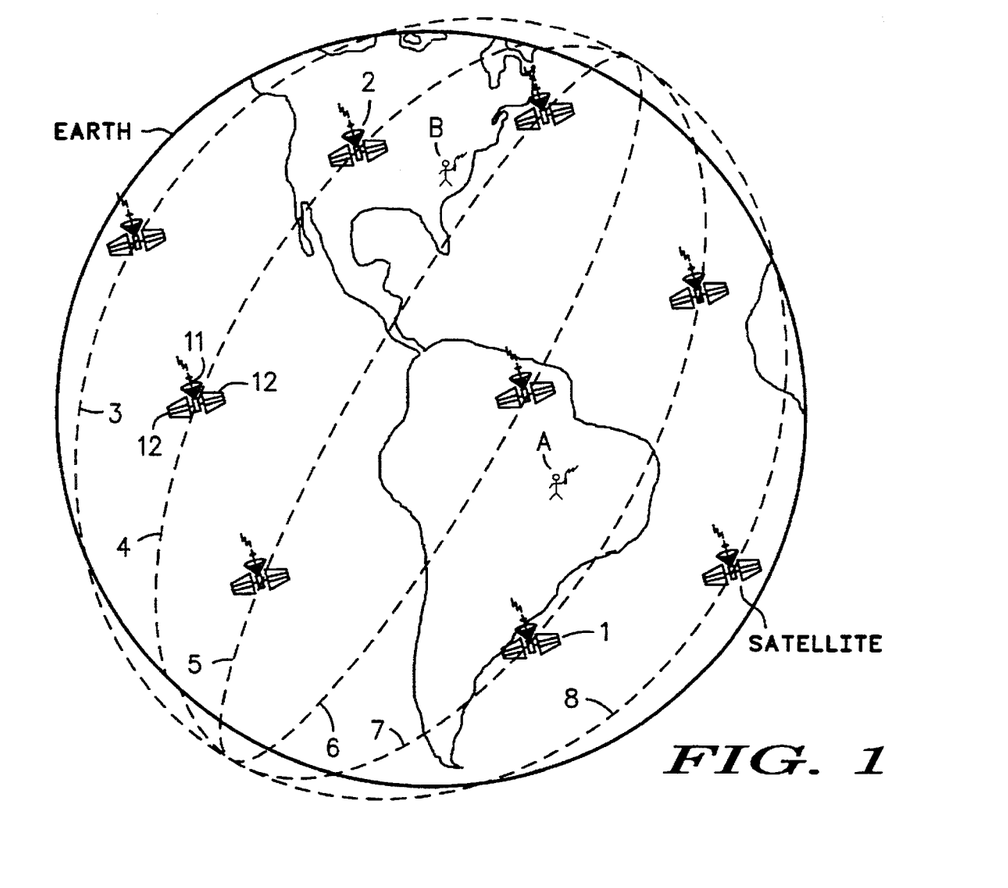
FIG. 1 depicts a highly simplified diagram of a satellite-based communication system of which the present invention may form a portion thereof.

Referring to FIG. 1, a highly simplified satellite configuration for an improved satellite cellular telephone communication system is shown. In this configuration, a number of satellites are shown in a low-earth orbit. A number of satellites are placed in each of the orbiting planes which is inclined at approximately 60° and provides continuous dual satellite switching coverage for most of the earth except for a few regions around the north and south poles. The satellites interface directly among a number of cellular telephone and data transmission equipped users and also interfaces these users to the public switched telephone network (PSTN).

This satellite cellular structure is somewhat analogous to present day cellular mobile telephone systems. In the current, terrestrial-based cellular systems, cellular sites are fixed and users are mobile. As a user travels from one cell site to another, his telephone call is handed off from one cellular switching unit to another.

In the present invention, users are relatively fixed at any given time while the satellites, which are the cells, are in continuous movement. With a hand-held or mobile mounted cellular telephone, connection to one of the satellite switches shown in FIG. 1 is made directly from the hand-held mobile mounted or remotely fixed telephone to one of the nearest satellite switches. Each satellite is moving about the earth. As the satellite which originally acted as the switching unit for a particular user leaves a cell of that switch, the user's call is "handed off" to the appropriate adjacent cell. Adjacent cells may be cells within one satellite or cells of other satellites located either in a particular orbiting plane or an adjacent orbiting plane. Users may "roam", but this roaming distance is relatively small compared to the traveling distance of the satellite switches.

Similar to the cellular mobile telephone system, the satellite cellular communication system provides spectral efficiency. This means that the same frequency may be simultaneously used by different satellite switches. Spectral efficiency is provided by the spatial diversity between the satellite switches and users.

The users may be located anywhere on a land mass, on the water or in the air at an altitude less than that of the low-earth orbiting satellites. For example, a person on one land mass could call a person on another land mass, a person on a boat or a person in an aircraft.

Low power hand-held mobile mounted or fixed radio telephones may be used in this system. The power requirement is less than 10 watts with present technology.

In this system, each satellite shown is a switching unit. Most conventional satellite communication systems act primarily as a relay station or "bent pipe". That is, they provide fixed point-to-point communications or communication from one point on earth, through the satellite to another point on earth. Conventional satellite communication systems lack the ability to communication with another satellite either in the same orbital plane or another orbital plane. In the present invention, a switching function is provided within each of the orbiting satellites so that satellites are able to communicate with satellites in the same orbital plane and satellites in different orbital planes.

As previously mentioned, each of the orbiting planes of the satellites is inclined at an angle of sixty degrees in the preferred embodiment. Orbiting satellite planes with higher and lower inclinations are workable. Continuous dual satellite coverage over most of the earth can be guaranteed by decreasing or increasing the altitude of the orbital plane relative to the angle of inclination. Satellites orbiting earth at the preferred inclined angle of 60° provide continuous dual coverage over most of the earth. Coverage is sporadic or non-existent over the north and south poles or is not guaranteed above the 80°–85° latitude.

In a preferred embodiment, it was found that continuous dual satellite coverage could be accomplished with eighty-one (81) low- earth orbiting satellites. These satellites could be arranged in nine (9) sixty degree inclined orbiting planes, nine (9) satellites per plane. Other configurations could be used, such as an eight-by-eight or seven-by-seven configurations. However, the altitude of the satellites would have to be adjusted to account for different sizes of the cell for constellations having fewer or more satellites than the preferred nine-by-nine satellite constellation.

Each satellite contains a satellite switching unit, suitable antennas 11 (helical antennas for up/down links and lenses for cross links, for example) and an unfolding array of solar cells 12 along with storage batteries (not shown) connected to the solar cells to provide power for the switching unit. The satellite buses or vehicles themselves are low-earth orbiting satellites such as are commercially available. The satellites are put into orbit by a launching vehicle. When in orbit, the solar cell array is opened and the switching unit thereby activated. The satellites are then individually brought on line via standard telemetry, tracking and control (TT&C) channels to form the network.

As shown in FIG. 1, a user A with a hand-held telephone goes off-hook. This request for a channel is received by a particular satellite 1, as shown in FIG. 1. A frequency channel is assigned to the user and the caller's desired number is then routed through the system. Each satellite is a distributed local processor and determines how switching of the call is to occur. Satellite 1 switches the call to the appropriate cell contained either within its own cell complement or to the appropriate satellite cell complement. The path is determined by each satellite switching unit until the call is received by satellite 2. Satellite 2 then routes this call to the particular hand-held user B shown in FIG. 1.

Although two hand-held users are shown, the users may be on the water, in a moving vehicle, airborne or part of a PSTN where the link is through a gateway. Each satellite is a local processor. The system determines to which appropriate satellite or cell the call is to be switched. Each satellite determines an optimal path from itself to the next appropriate satellite. These determinations may be made based upon the office code portion of the telephone number of the called user.

Each satellite typically projects at least four (4) or more lobes onto the earth and comprises at least four (4) or more corresponding cells for switching. These lobes of coverage are achieved via antennas (helical typically) with fixed beam widths appropriate to the number of lobes. Overlapping cells will be differentiated using present cellular techniques. Each satellite determines the optimal path from it to the next satellite through which to route a particular call or data transmission. These satellite switches operate on data packets and therefore, may transmit digital voice or data. Downlink and uplink data/digital voice is received on an FDM basis demodulated and then packetized for satellite-to-satellite communication.

Figure 2:
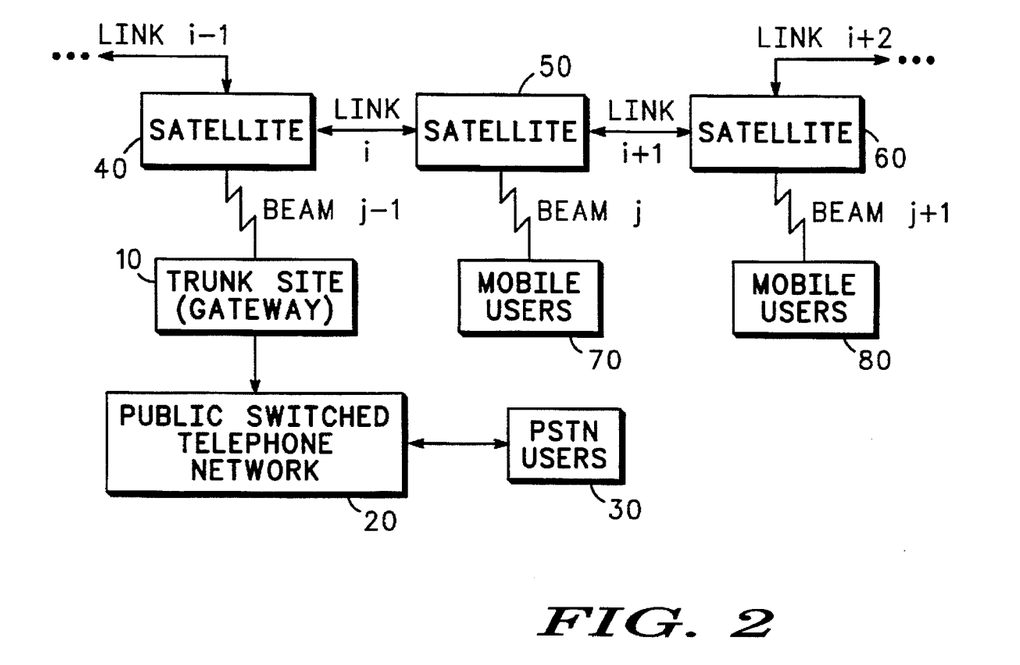
FIG. 2 is a simplified block diagram depicting the interconnection of the satellite switching units with its association mobile users and interconnection to the public switched telephone network.

FIG. 2 depicts the interconnection of a portion of one plane of satellites. In addition, the connection of the satellite to the satellite's corresponding mobile users and to the public switched telephone network is shown. Three satellites are shown in FIG. 2: satellite 40, satellite 50 and satellite 60. Satellite 40 is connected to satellite 50 by link i. Satellite 50 is connected to satellite 60 by link i+1. Satellite 60 is connected to the next sequential satellite of the plane (not shown) via link i+2. Satellite 40 is connected to the next preceding satellite (not shown) via link i−1. Each plane of satellites forms a ring of connected satellites around the earth.

As previously mentioned, the drawing of FIG. 2 shows one plane of the satellites. In addition, each satellite is connected via radio or optical communications to one or more satellites in other orbiting planes. That is, each satellite is connected to a previous and next satellite in its orbiting plane and to one or more satellites in other orbiting planes.

The inter-satellite links link i−1, link i, etc. may be implemented via data transmission on a microwave beam or via a laser beam. Existing technologies currently provide for such data transmission.

Connection between the satellites and its mobile users is achieved by beams j−1, and j+1, for example. These beams correspond to the lobes shown in FIG. 3 and to the switching cells mentioned above. These beams are achieved via the satellite up/down link antennas which provide communication to users via the users omni-directional antenna. The limit on the number of users that a particular satellite may handle at one time depends on bandwidth allocated plus power available on the satellite. Typically this number may be 50,000 users per satellite.

Satellite 40 is shown connected to a trunk site or gateway 10 via beam j−1. Any satellite, such as satellite 40, is capable of transmitting and receiving data from a gateway, such as gateway 10. This gateway link can be accomplished using the packetized data similar to the satellite-to-satellite links.

Gateway 10 includes units which interconnect to the public switched telephone network (PSTN) 20. All public switched telephone network users 30 are connected to the public switched telephone network 20. As a result of the satellite 40 being connected through gateway 10 to PSTN 20, a mobile user of the satellite cellular system which is connected directly via a beam to a satellite may transit voice or data via the satellite structure (satellite-to-satellite via corresponding links), through gateway 10, through the public switched telephone network 20 to selected users of the PSTN 30 or vice versa.

Each satellite provides several data transmission beams. These data transmission beams project the lobes of coverage shown in FIG. 3 for a nine-by-nine orbiting constellation in accordance with a preferred embodiment. The satellites are orbiting at a 60° inclination at an altitude of 1118 km, with a 10° elevation footprint.

As shown in FIG. 2, a satellite may use one or more of its beams to provide an interface to a gateway. At least one beam is required for establishing a link between each gateway and the satellite. Typically a satellite links to only one gateway. One gateway provides sufficient trunking to interconnect a number of mobile users to the public switched telephone network 20.

Each satellite performs internal switching among its beams or cells. This is analogous to intra-office switching for conventional telecommunication systems. The up/down linking arrangement between the satellites and its mobile users or gateways via the beams may transmit and receive data in the range of approximately 2.1 to 3.9 GHz, for example. The present technology and band availability makes this a preferred data transmission range. However, the scope of the present invention is not limited to data transmission exclusively within this range.

As previously mentioned, the data (digital voice or data) is transmitted in packet form. As a result, high-speed data transmission as well as voice data transmission may be accomplished via the satellite system. Data transmission rates, given the present available bandwidths, are at least 1200 baud. However, with extended bandwidth, substantially higher data rates can be achieved by this system.

Figure 3:
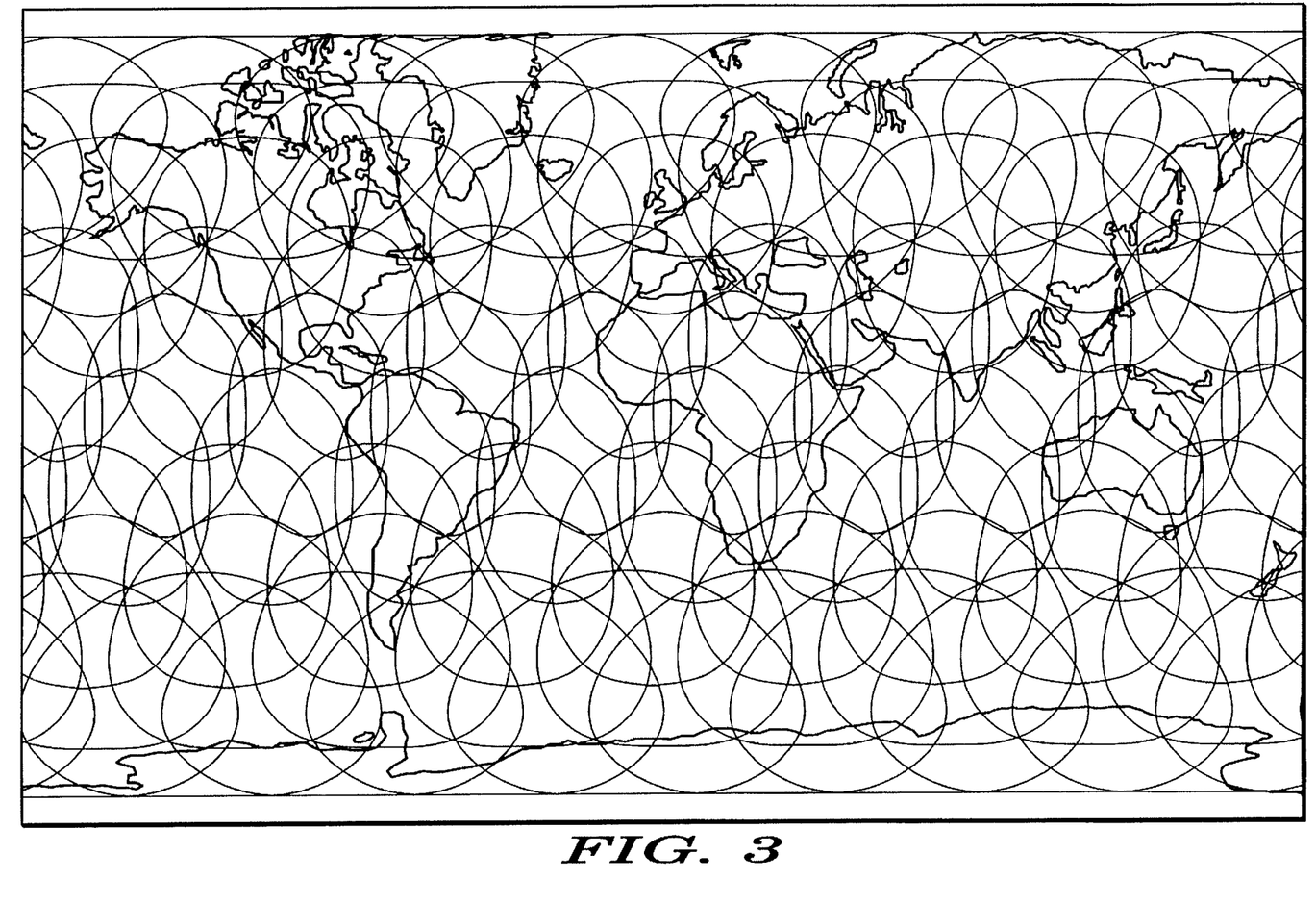
FIG. 3 shows dual beam coverage on areas served by a cellular satellite switch constellation about the earth.

FIG. 3 shows dual satellite coverage over earth of a nine-by-nine satellite constellation in accordance with a preferred embodiment of the present invention. According to the preferred embodiment, the satellites are inclined at 60° and are at an altitude of 1118 kilometers. Other angles of inclination could be used as well, except to achieve dual satellite coverage, the altitude of the satellites may also have to change. The satellites also have a minimum 10° elevation angle footprint.

As shown in FIG. 3, the patterns of the satellites show the absence of a counter-rotating seam. The absence of the counter-rotating seam means that the problems with establishing and maintaining radio or optical communications between satellites travelling in opposite directions is minimized. Moreover, as shown, there is more weaving of the satellites.

The satellite constellation is built on the geometric relationship of a triangle, which may be an equilateral triangle, for example. Four satellites are related to each other in a parallelgram geometric relationship. This configuration allows for the satellites to be grouped in such a way to provide the necessary coverage. The minimum elevation angle (10° in the preferred embodiment) is met at the intersection point of the three satellites represented by the triangular geometry.

Figure 4:
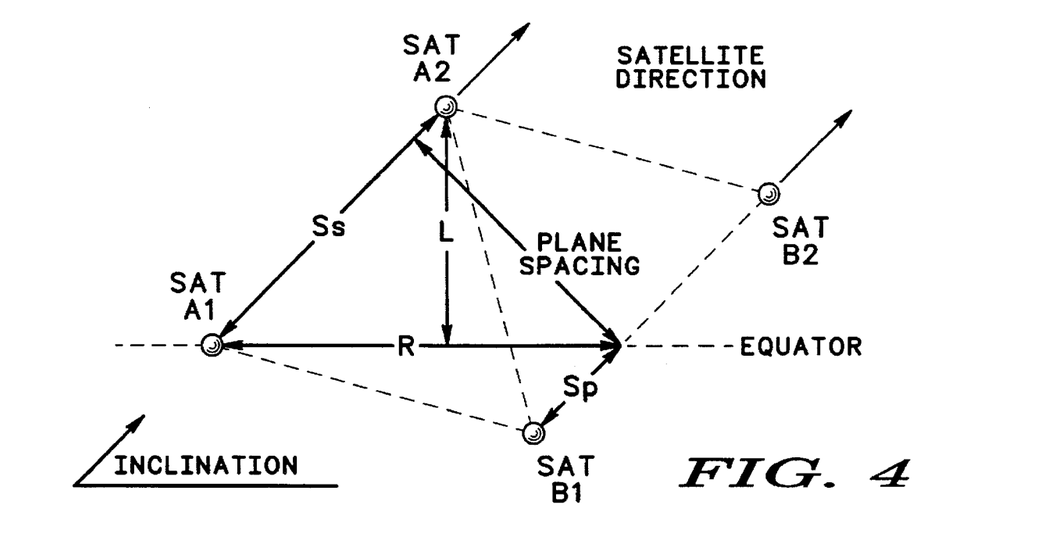
FIG. 4 shows constellation geometry for determining spacing between satellites in the same orbital plane and between satellites in different orbital planes.

FIG. 4 shows constellation geometry of the spacing between satellites in the same plane and satellites in another orbital plane for satellites between an angle of inclination of 30' to 90' (prograde) or 90' to 150' (retrograde) in accordance with a preferred embodiment of the present invention. Satellites $A_1$ and $A_2$ are in the same orbital plane, while satellites $B_1$ and $B_2$ are in the same orbital plane. Spacing between satellites in the same orbital plane is given by the following equation:

$$S_S = 360/N_S \tag{1}$$

where,
$N_S$=number of in-plane satellites
$S_S$=satellite spacing (in degrees)

Spacing between satellites in a different orbital plane is given by the following equations:

$$R = \sqrt{3} \, (S_S) \div 2 \sin i \tag{2}$$

$$S_p = S_S[0.5 - (\sqrt{3} \div 2 \tan i)] \tag{3}$$

$$L = \sqrt{3} \, (S_S) \div 2 \sin (i+30) \tag{4}$$

where,
i=satellite inclination (in degrees)
R=RAAN spacing (in degrees)
$S_p$=satellite phasing (in degrees)
L=latitude spacing (in degrees)

By using equations (1)–(4), satellites in the constellation have a triangular geometric relationship to each other. As shown in FIG. 4, satellites $A_1$, $A_2$ and $B_1$ have a triangular relationship to each other. Similarly, satellites $A_2$, $B_1$ and $B_2$ have a triangular geometric relationship.

Dual coverage is also defined by the geometry of the triangular shape. For any constellation of satellites that is optimally designed around the triangular geometry. Dual satellite coverage can be guaranteed below 60° latitude by either overpopulating the constellation with more satellites (sub-optimally), or flying the constellation at a higher altitude.

The co-rotating satellites all maintain the same relationships so that the cross-links are not affected. If the cross-link network is based on the geometry of a triangle, the cross-link is independent of the satellite inclination. In other words, as long as the geometrical relationship is maintained, the dynamics are the same.

Instead of east-west cross-links occurring across different orbital planes and across the seam as they do with satellites having polar orbits, east-west cross-links mostly stay within the same orbital plane. This is due to the fact that the satellites are orbiting earth at an inclined angle of 60° (or some other angle). Moreover, cross-link seam dynamics minimizes or eliminates communication across a seam.

Figure 5:
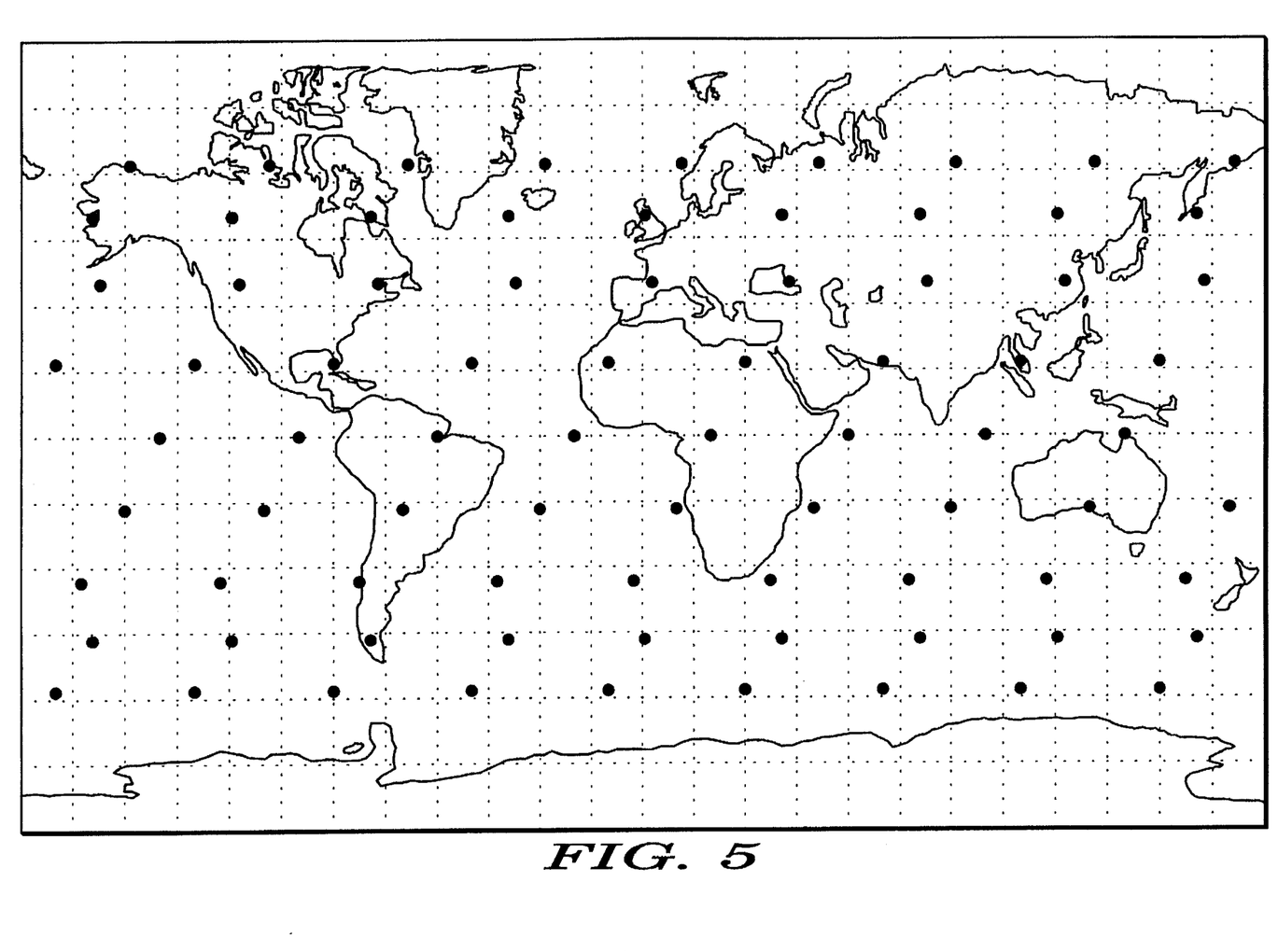
FIGS. 5–6 show satellite points and a time sequence of a satellite constellation in accordance with a preferred embodiment of the invention.
Figure 6:
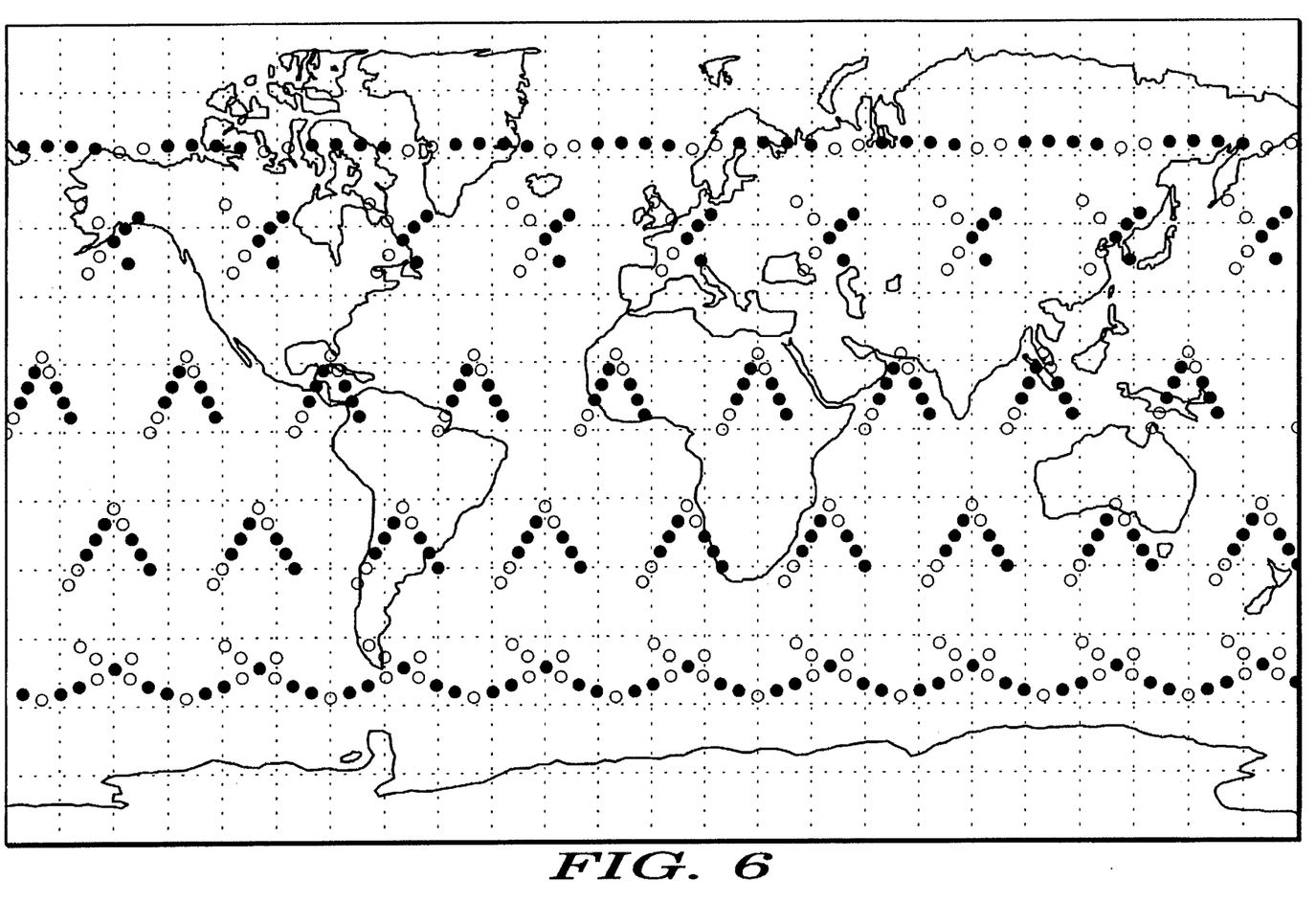

In accordance with a preferred embodiment, FIGS. 5 and 6 show sub-satellite points and a time sequence of six one minute steps showing the relative movement of each of the 81 satellites in a nine-by-nine satellite constellation. Each of the orbits of the satellites are inclined at 60° at an altitude of 1118 km and have a 10° elevation footprint.

Figure 7:
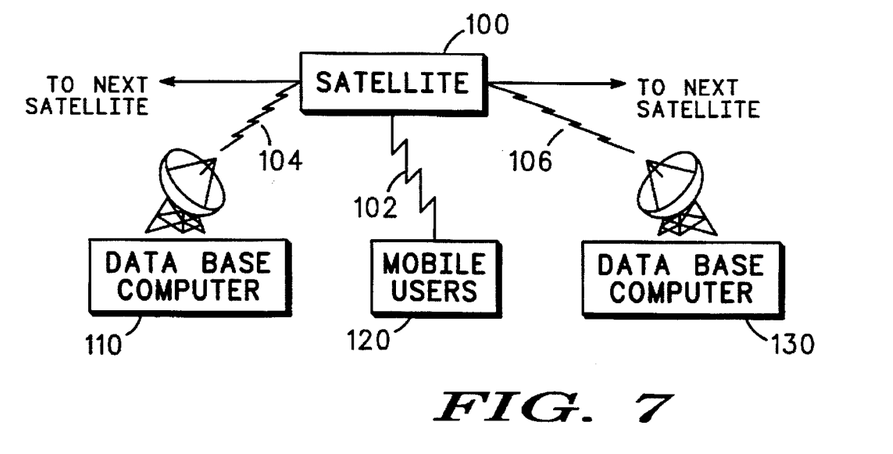
FIG. 7 shows a block diagram of a data base arrangement for a satellite cellular communication system.

FIG. 7 depicts one satellite switching unit 100 directly connected to mobile users 120 via beam 102. Satellite 100 is connected to data base computer 110 via beam 104. Satellite 100 is also connected to data base computer 130 via beam 106. This connection may be direct via a beam 106 as shown in FIG. 7 or indirect through other satellites to data base computer 130.

A mobile user might "roam" or travel in a home area. The home area may be a city, such as New York, Los Angeles, etc. The data base computer 110 contains all the information relative to each of its mobile users. As long as a particular mobile user is operating within his home area, all the available information concerning that user is available at the local home area data base computer.

If, for example, a home area user in Los Angeles travels to New York City and attempts to use his satellite cellular telephone for communication, the data base computer in the user's new area, New York City, is not aware of the existence of that user. If data base computer 110 is the mobile user's home area, Los Angeles, data base computer 110 has all the information for this particular mobile user. As a result, the mobile user would not be allowed to place calls because he was not recognized by his home area's data base computer.

In order to overcome this problem, each mobile user is periodically interrogated by the system as to its location so when he goes off-hook, his call for service can be recognized and routed. However, since the data base of a particular user is stored in his home area data base computer via the satellite system, the satellite system first interrogates the home area to determine that he is no longer there and to obtain the user's switching information. When that determination is made, the new home area's data base computer can be updated to include this "roaming" user. As a result, this user is then allowed to originate and receive calls in his new area. Because the satellite system interrogates the user's home data base computer to determine his location, the user can be found throughout the entire satellite system. Thus, the system provides the capability for finding "roaming" users and establishing communications with them.

To facilitate tracking of each mobile user, each mobile telephone provides a control signal which is periodically monitored so that when a subscriber originates a call, the nearest satellite can track him and through the satellite network interrogate his home data base computer to determine his pertinent customer information. The mobile telephone may automatically indicate to the satellite network a new location for updating the data base computer. This control signal allows the incoming calls of "roaming" users to be validated via satellite-to-satellite linking to the home area's data base computer.

Each satellite in the satellite cellular communication system is self-navigating. That is, it uses the Global Positioning Satellite system (GPS) or time and ephemeris data from which to compute its location information. In addition, from the fixed location of the Global Positioning Satellite system or other vehicle, each satellite can determine its position and alter its course accordingly to stay within its proper orbit while providing switching services.

Each satellite may switch a call intra-satellite (within the particular switching unit or cell) or may connect the call via a microwave or laser links (link i, i+1, etc.) to another satellite within its plane or out of plane (adjacent). Each satellite may distinguish a particular telephone number and determine whether that number is within its own calling area or the area of another satellite. If it is within the area of another satellite, the call is cross-linked to the next appropriate satellite or cell which makes the same determination until the satellite serving that telephone number is reached. That satellite down-links to the particular mobile user sought to be called. Due to this structure, the satellite network provides a distributed nodal switching capability. Each satellite is a local switch for a particular area, but the area is constantly changing. Therefore, calls are handed-off as satellites move out of the range of a particular telephone user.

Various multiplexing techniques (i.e. FDMA, TDM, CDMA, etc.) may be used to enhance the transmission capability between various satellites on the links as shown in FIG. 2.

Since the switching units of this system are orbiting the earth and relatively secure from tampering, this system provides the capability to support secure voice and data transmission via data encryption and decryption techniques commonly known in the art. Since the switching units enjoy the security of being hundreds of miles above the earth, the system also lends itself to military communication applications.

As described, a satellite constellation that is inclined at a 60° angle provides multiple benefits and advantages over polar orbits. The improved satellite constellation eliminates the counter-rotating seam and the problems associated with communicating across the seam. The improved satellite constellation guarantees dual satellite coverage for at least 85% of the earth. Because of the dual satellite coverage, gateway horizon interference is reduced. The satellite constellation increases the reliability of communication, while improving power management and concrete performance. Moreover, there is a lower delay time for establishing communication with the subscriber units in most cells of the satellite constellation. Another advantage is that geolocation is improved. A further advantage is that load balancing and resource allocation are improved.

What is claimed is:

1. An improved satellite cellular communication system of the type having a plurality of satellite switching units and a link means for coupling users to at least one of said satellite switching units, each of said satellite switching units communicating with adjacent satellite switching units, and wherein the improvement comprises:

said satellite switching units being positioned surrounding earth in a low-earth orbit at an angle of inclination between thirty and ninety degrees, wherein satellite spacing ($S_S$) between a number of satellite switching units in a same orbital plane is based on 360 degrees divided by the number of satellite switching units, and spacing between a first satellite switching unit in a first orbital plane and a second satellite switching unit in a second orbital plane is based on $\sqrt{3}\ (S_S)\div 2\ \sin i$ and $S_S[0.5-(\sqrt{3}\div 2\ \tan i)]$ and $L=\sqrt{3}\ (S_S)\div 2\ \sin (i+30)$.

2. An improved satellite cellular communication system as recited in claim 1, wherein the satellite switching units include means for providing continuous dual satellite coverage of at least eighty-five percent of the earth.

3. An improved satellite cellular communication system as recited in claim 1, wherein the plurality of satellite switching units orbit the earth in a plurality of orbital planes.

4. An improved satellite cellular communication system as recited in claim 3, wherein nine satellite switching units orbit the earth in each of nine orbital planes.

5. An improved satellite cellular communication system as recited in claim 3, wherein eight satellite switching units orbit the earth in each of eight orbital planes.

6. An improved satellite cellular communication system as recited in claim 3, wherein seven satellite switching units orbit the earth in each of seven orbital planes.

7. An improved satellite cellular communication system as recited in claim 1, wherein said satellite switching units are positioned surrounding the earth in a low-earth orbit at an angle of inclination of sixty degrees and at an altitude of 1118 kilometers to provide dual coverage over at least eighty-five percent of the earth.

8. An improved satellite cellular communication system of the type having a plurality of satellite switching units and a link means for coupling users to at least one of said satellite switching units, each of said satellite switching units communicating with adjacent satellite switching units, and wherein the improvement comprises:

said satellite switching units being positioned in a triangular geometric relationship to each other and surrounding earth in a low-earth orbit at an angle of inclination between thirty and ninety degrees, wherein satellite spacing ($S_S$) between a number of satellite switching units in a same orbital plane is based on 360 degrees divided by the number of satellite switching units, and spacing between a first satellite switching unit in a first orbital plane and a second satellite switching unit in a second orbital plane is based on $\sqrt{3}\ (S_S)\div 2\ \sin i$ and $S_S[0.5-(\sqrt{3}\div 2\ \tan i)]$ and $L=\sqrt{3}\ (S_S)\div 2\ \sin (i+30)$.

9. An improved satellite cellular communication system of the type having a plurality of satellite switching units and a link means for coupling users to at least one of said satellite switching units, each of said satellite switching units communicating with adjacent satellite switching units, and wherein the improvement comprises:

said satellite switching units being positioned in a parallelogram geometric relationship to each other and surrounding earth in a low-earth orbit at an angle of inclination between thirty and ninety degrees, wherein satellite spacing ($S_S$) between a number of satellite switching units in a same orbital plane is based on 360 degrees divided by the number of satellite switching units, and spacing between a first satellite switching unit in a first orbital plane and a second satellite switching unit in a second orbital plane is based on $\sqrt{3}$ $(S_S)\div 2$ sin i and $S_S[0.5-(\sqrt{3}\div 2$ tan i$)]$ and L=$\sqrt{3}$ $(S_S)\div 2$ sin (i+30).

10. An improved satellite cellular communication system of the type having a plurality of satellite switching units and a link means for coupling users to at least one of said satellite switching units, each of said satellite switching units communicating with adjacent satellite switching units, and wherein the improvement comprises:

said satellite switching units being positioned in a triangular geometric relationship to each other and surrounding earth in a low-earth orbit at an angle of inclination between thirty and ninety degrees to provide continuous dual coverage over at least eighty-five percent of the earth, wherein satellite spacing $(S_S)$ between a number of satellite switching units in a same orbital plane is based on 360 degrees divided by the number of satellite switching units, and spacing between a first satellite switching unit in a first orbital plane and a second satellite switching unit in a second orbital plane is based on $\sqrt{3}$ $(S_S)\div 2$ sin i and $S_S[0.5-(\sqrt{3}\div 2$ tan i$)]$ and L=$\sqrt{3}$ $(S_S)\div 2$ sin (i+30).

11. An improved satellite cellular communication system as recited in claim 8, wherein the satellite switching units include means for providing continuous dual satellite coverage of at least eighty-five percent of the earth.

12. An improved satellite cellular communication system as recited in claim 8, wherein the plurality of satellite switching units orbit the earth in a plurality of orbital planes.

13. An improved satellite cellular communication system as recited in claim 12, wherein nine satellite switching units orbit the earth in each of nine orbital planes.

14. An improved satellite cellular communication system as recited in claim 12, wherein eight satellite switching units orbit the earth in each of eight orbital planes.

15. An improved satellite cellular communication system as recited in claim 12, wherein seven satellite switching units orbit the earth in each of seven orbital planes.

16. An improved satellite cellular communication system as recited in claim 8, wherein said satellite switching units are positioned surrounding the earth in a low-earth orbit at an angle of inclination of sixty degrees and at an altitude of 1118 kilometers to provide dual coverage over at least eighty-five percent of the earth.

17. An improved satellite cellular communication system of the type having a plurality of satellite switching units and a link means for coupling users to at least one of said satellite switching units, each of said satellite switching units communicating with adjacent satellite switching units, and wherein the improvement comprises:

said satellite switching units being positioned surrounding earth in a low-earth orbit at an angle of inclination between thirty and ninety degrees so that said satellite cellular communication system does not have a counter-rotating seam, wherein satellite spacing $(S_S)$ between a number of satellite switching units in a same orbital plane is based on 360 degrees divided by the number of satellite switching units, and spacing between a first satellite switching unit in a first orbital plane and a second satellite switching unit in a second orbital plane is based on $\sqrt{3}$ $(S_S)\div 2$ sin i and $S_S$ $[5-(\sqrt{3}\div 2$ tan i$)]$ and L=$\sqrt{3}$ $(S_S)\div 2$ sin (i+30).

18. An improved satellite cellular communication system of the type having a plurality of satellite switching units and a link means for coupling users to at least one of said satellite switching units, each of said satellite switching units communicating with adjacent satellite switching units, and wherein the improvement comprises:

said satellite switching units being positioned in an equilateral triangular geometric relationship to each other and surrounding earth in a low-earth orbit at an angle of inclination between thirty and ninety degrees, wherein satellite spacing $(S_S)$ between a number of satellite switching units in a same orbital plane is based on 360 degrees divided by the number of satellite switching units, and spacing between a first satellite switching unit in a first orbital plane and a second satellite switching unit in a second orbital plane is based on $\sqrt{3}$ $(S_S)\div 2$ sin i and $S_S[0.5-(\sqrt{3}\div 2$ tan i$)]$ and L=$\sqrt{3}$ $(S_S)\div 2$ sin (i+30).

\* \* \* \* \*

UNITED STATES PATENT AND TRADEMARK OFFICE
CERTIFICATE OF CORRECTION

PATENT NO. : 5,641,134
DATED : JUNE 24, 1997
INVENTOR(S) : GREGORY B. VATT

It is certified that error appears in the above-identified patent and that said Letters Patent is hereby corrected as shown below:

Colunm 10, line 21, claim 17, change "[5" to --[.5--.

Signed and Sealed this

Ninth Day of November, 1999

Attest:

Q. TODD DICKINSON

*Attesting Officer*    *Acting Commissioner of Patents and Trademarks*